United States Patent [19]
Addison et al.

[11] Patent Number: 5,395,261
[45] Date of Patent: Mar. 7, 1995

[54] SERVICEABLE DATA TERMINAL STRUCTURE

[75] Inventors: Danny H. Addison, Durham; Johnnie M. Carnes, Apex; Robert L. Cowardin, Cary; Albert N. Gore, III, Raleigh; Robert C. Lynch, Cary; Charles M. McCray, Raleigh, all of N.C.; Shigeji Narisawa, Kanagawa, Japan; William L. Talley, Raleigh, N.C.; Yoshinair Toyosato, Kawasaki, Japan; Craig W. Turner, Raleigh, N.C.

[73] Assignee: International Business Machines Corporation, Armonk, N.Y.

[21] Appl. No.: 61,990

[22] Filed: May 14, 1993

[51] Int. Cl.[6] .......................................... H01R 13/631
[52] U.S. Cl. .................................... 439/310; 439/347; 439/378
[58] Field of Search ................ 439/157, 310, 362-365, 439/372, 374, 378, 347; 312/333; 361/727

[56] References Cited

U.S. PATENT DOCUMENTS

| 2,514,246 | 7/1950 | Knox | 361/727 |
| 4,939,622 | 7/1990 | Weiss et al. | 361/727 |
| 5,077,722 | 12/1991 | Geist et al. | 439/483 |

Primary Examiner—Neil Abrams
Attorney, Agent, or Firm—Joscelyn G. Cockburn

[57] ABSTRACT

An electronic equipment drawer is aligned with an electrical connector in a tunnel in the horizontal and vertical directions with alignment pins and holes. A screw drive and cam mounted on the drawer engages a surface of an opening in a wall of the tunnel and controls insertion into the tunnel to provide proper electrical contact and lock the drawer in place in the tunnel. Within the drawer a bus extender card inserted in a connector centrally located on a mother board is supported by surfaces on a bar extending between end walls of the drawer. The end walls include pairs of channels on opposed walls which support feature cards inserted into connectors mounted on the bus extender card.

4 Claims, 6 Drawing Sheets

SERVICEABLE DATA TERMINAL STRUCTURE

BACKGROUND OF THE INVENTION

1. Field of the Invention

The present invention is directed to the design and structure of data terminal or the like which are easily serviced when needed.

2. Description of Related Art

In most instances data terminals such as point of sale terminals include a number of components which are stacked or assembled and inter connected at the point of use. When service is required it is desirable to have access to replaceable units within the covers without disrupting the interconnected components. One technique for accomplishing this result is to provide front access to the replaceable units.

U.S. Pat. Nos. 3,264,601 and 4,682,833 illustrate different structures which allow insertion and removal of modular components arranged in drawer like structures from one side (front) of a cabinet which contains a number of cells or tunnels for receiving the drawers. The drawers, when inserted, engage connectors in each cell or tunnel which are interconnected to form a complete machine.

In a point of sale terminal application it is essential to utilize standard commercially available components wherever possible to control and or reduce cost. In addition, the point of sale terminal application imposes severe operating conditions, especially so when vibration is considered. Each time a sale is completed the cash drawer is opened automatically by the system and closed by the sales clerk. Testing and past experience have established that the cash drawer function involves significant vibrational forces which are transferred to the electrical components within the cabinet.

Since the drawer obscures the view of the connector when inserted in the tunnel it is necessary to align the drawer and the connector in both the horizontal and vertical directions. This can be accomplished with locating pins and mating holes in the components to be aligned. However, in addition it is necessary to provide the proper degree of insertion and a locking mechanism to maintain proper electrical contact in the presence of excessive vibration.

SUMMARY OF THE INVENTION

The invention contemplates an alignment mechanism for aligning a connector mounted on a rear wall of a cabinet tunnel and a connector mounted on a drawer which is adapted to be inserted in the tunnel having a first means for aligning the connector on the drawer in a horizontal direction in the plane of the rear wall, a second means for aligning the connector on the drawer in a vertical direction in the plane of the rear wall, third means attached to the drawer and coacting with a wall of the tunnel for controlling the insertion of the drawer into the tunnel and locking the drawer with respect to the tunnel.

The invention also contemplates a structure for supporting and connecting feature circuit cards to a bus contained on a system board mounted on a drawer, a connector connected to the system bus and mounted on the top surface of the system board is adapted to receive a vertically disposed bus extender card which is provided with one or more connectors on at least one side, a support member attached to the drawer structure engages the top of the bus extender card to prevent movement and horizontally disposed guides on the drawer support feature cards inserted in the connectors on the bus extender card.

DESCRIPTION OF THE PREFERRED EMBODIMENT

Figure 1:
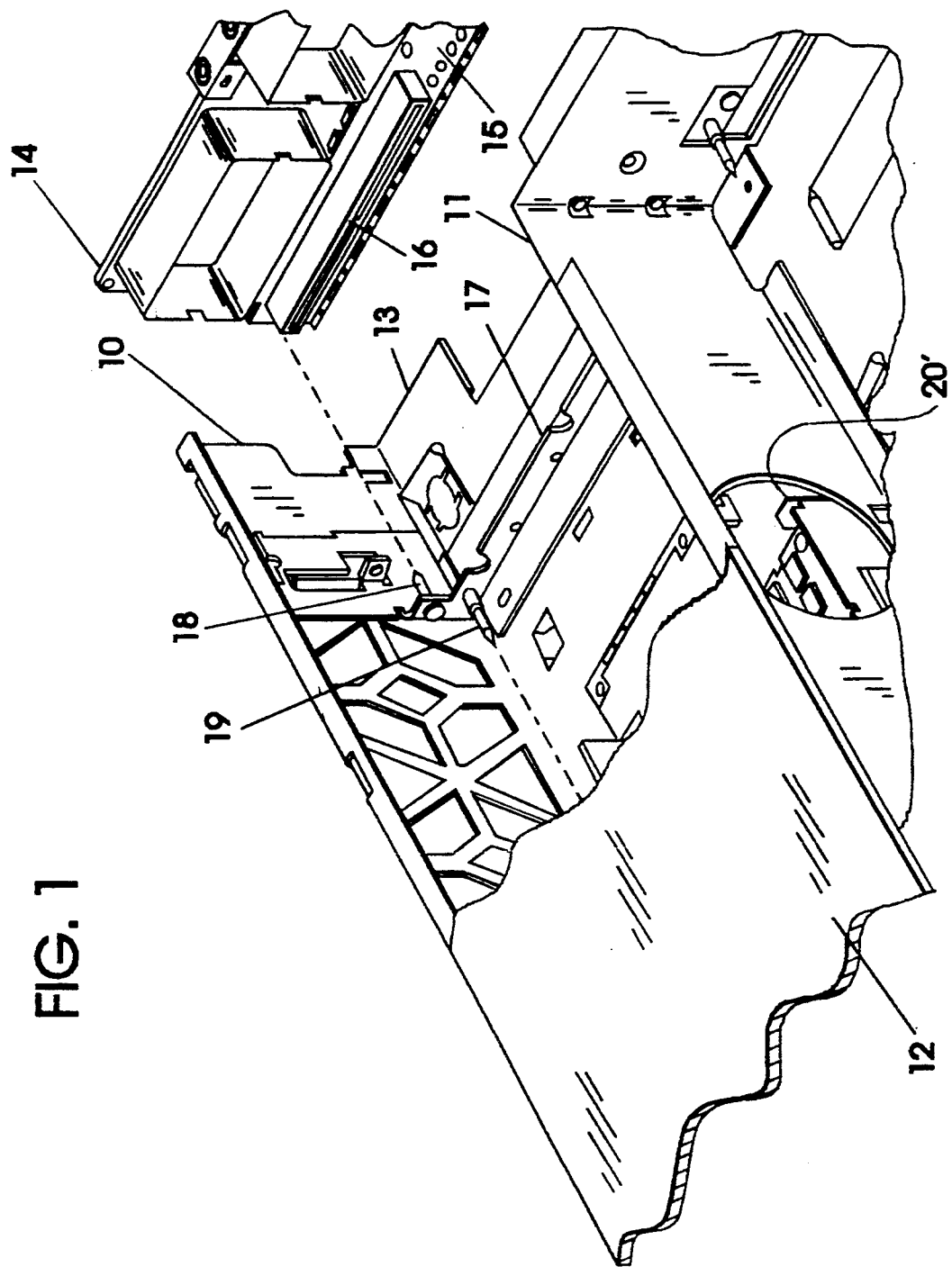
FIG. 1 is a partial perspective view of the four surfaces of an equipment tunnel and a portion of the rear cover including the attached circuit card and a connector mounted thereon.
Figure 2:
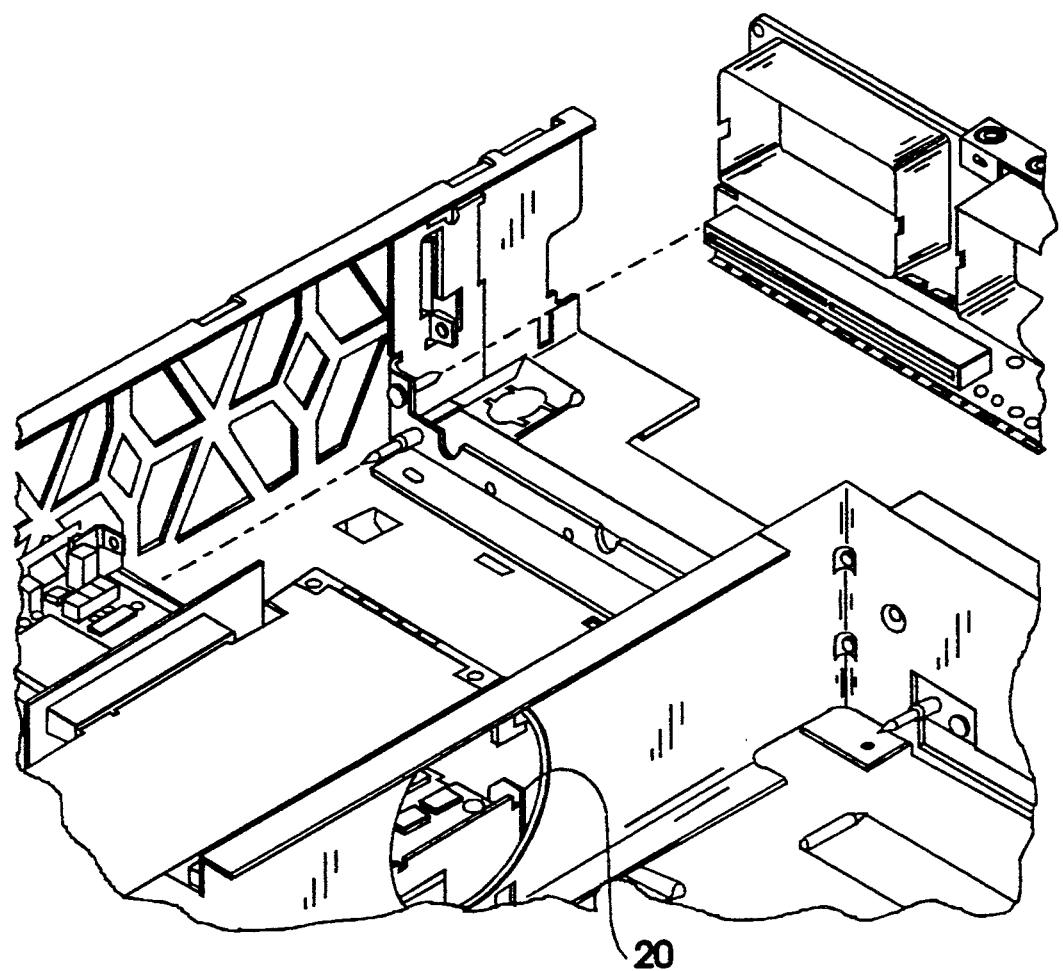
FIG. 2 is identical to FIG. 1, however, the top surface of the tunnel has been removed to reveal a partially inserted drawer which includes a feature card mounted on a bus extender card.

In FIG. 1 the tunnel is defined by two vertically disposed side walls 10 and 11, a top 12 and a bottom 13. A rear cover 14 has a circuit card 15 attached thereto preferably by rivets not shown. A connector 16 is mounted on the circuit card 15. A vertical member 17 connected to the bottom 13 is provided with at least two rearward and two forward facing locating pins 18 and 19, respectively. The pins 18 engage locating holes 20' in the circuit card 15 and accurately position the circuit card 15 with respect to the pins 19 which will position the drawer 20 in a horizontal and vertical direction with respect to the circuit card 15. FIG. 2 is identical in all respect to FIG. 1, however, since the cover 12 has been removed more detail of the partially inserted drawer 20 is revealed.

Figure 3:
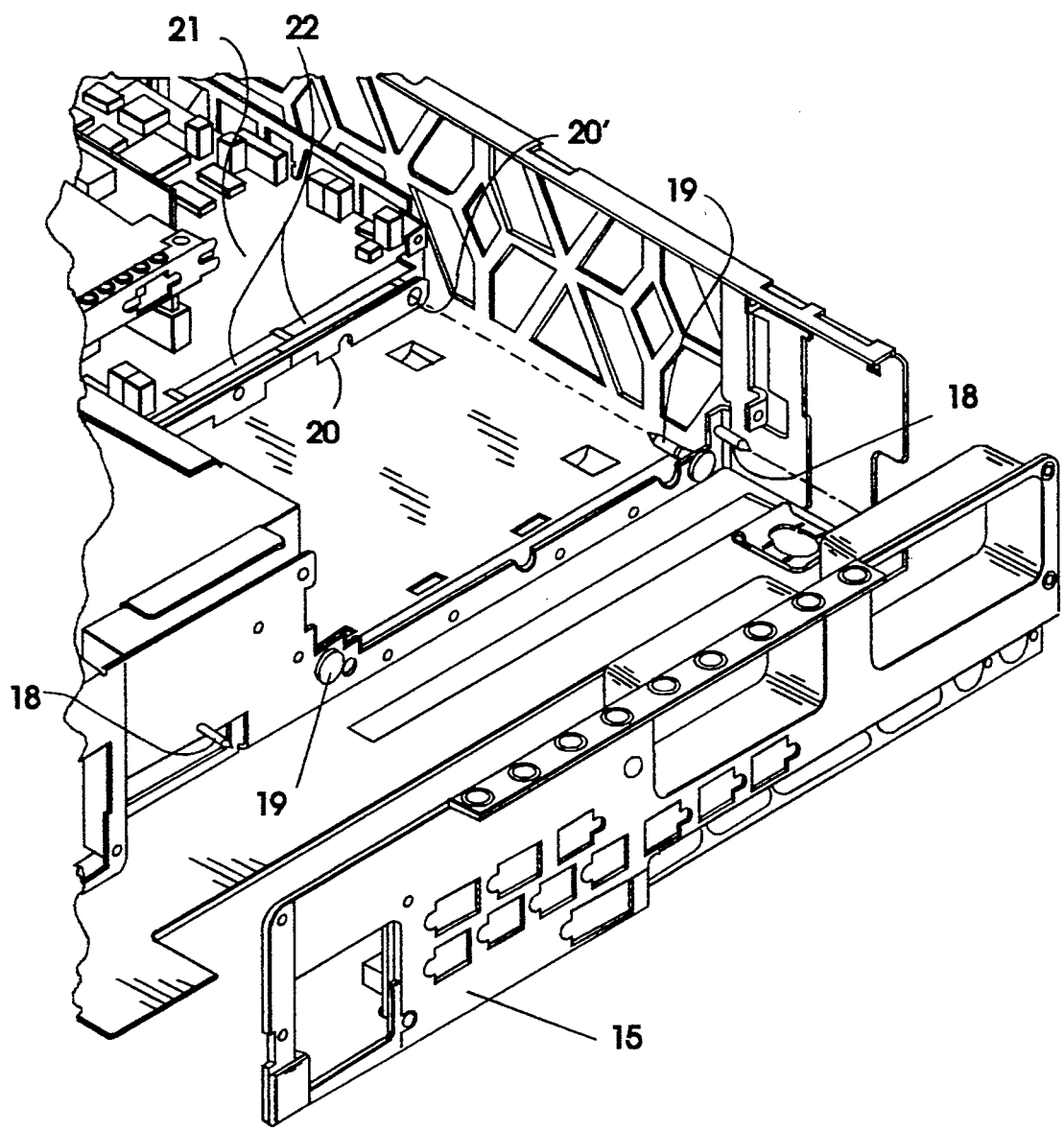
FIG. 3 is similar to FIG. 2, however, the structure is viewed from the rear of the tunnel.

The view illustrated in FIG. 3 shows the additional pins 18 and 19 used to locate the circuit card 15 and the drawer 20, respectively. Pins 19 engage holes 20' to position the drawer 20 with respect to the circuit card 15 and the connector 16 mounted thereon. Also visible in the view illustrated in FIG. 3 are the system card 21 and the card edge connector 22 which are inserted in the connector 16 when the drawer 20 is fully inserted as will be described below.

Figures 4A, 4B:
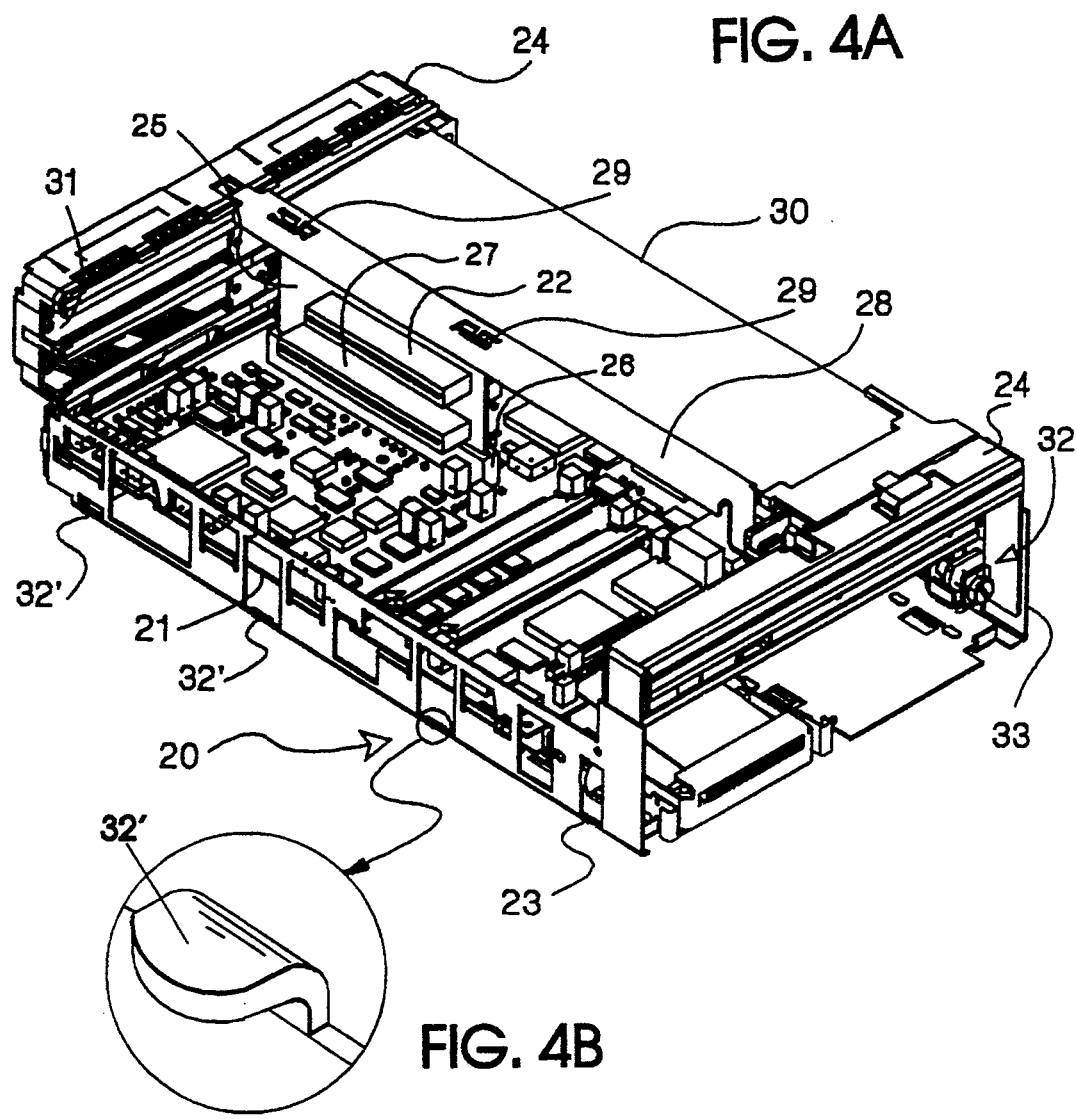
FIG. 4 is a perspective view of a drawer removed from the tunnel.

The drawer 20 illustrated in FIG. 4 includes a generally U shaped base 23 for supporting the system card 21. Feature card supports 24 are attached to the front and back of base 23. A bus extender card 25 is plugged into a connector 26 mounted on system card 21 and electrically connected to the system bus on card 21. A plurality of feature card connectors 27 are mounted on both sides of card 25 and are electrically connected to the extended bus on the card 25.

A removable support 28 is attached to and extends between the two feature card supports 24, When installed removable support 28 holds card 25 in the operative position. Two pair of tabs 29 engage the sides of card 25 and prevent lateral movement while the remainder of support 28 restricts movement in the vertical direction. A single feature card 30 is illustrated in the installed position. Feature card 30 is supported in channels 31 formed in feature card supports 24. Four tabs 32' extend from the base 23 and provide a low friction coarse guide when the drawer 20 is inserted in the tunnel.

Figure 5:
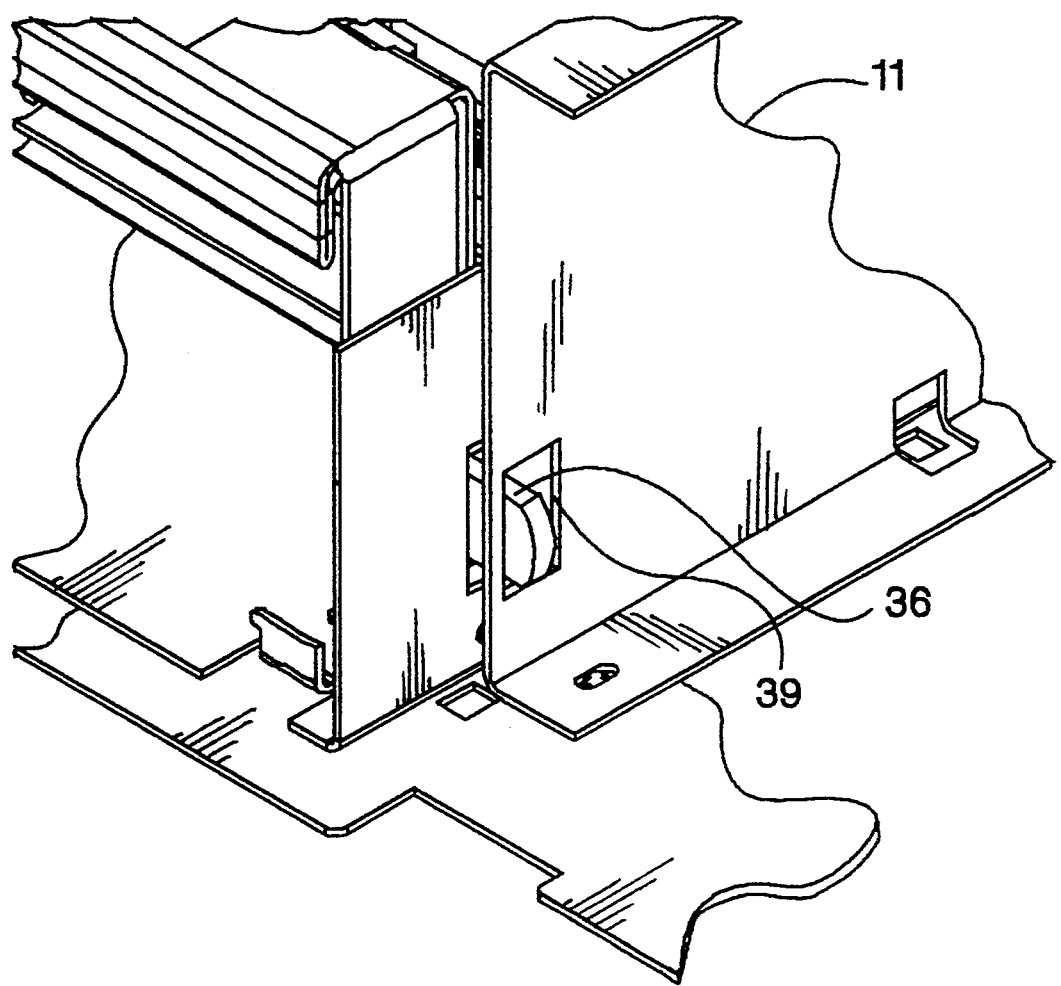
FIG. 5 is a partial perspective view of the drawer and one side wall of the tunnel.

A drawer insertion control mechanism 32 is attached to one or both of the side walls 33 of the base 23. Mechanism 32 will be described in greater detail below in connection with the description of FIGS. 5 and 6. The additional components illustrated in FIG. 4 will not be further described since they are not involved in the invention and have been included only to illustrate an environment in which the invention is particularly useful. Drawer insertion control mechanism 32 is illustrated in detail in FIG. 6 and the detail illustrated in FIG. 5 shows how it interacts with for example one of the side walls 10 or 11 of the tunnel to produce the desired insertion force.

Figure 6:
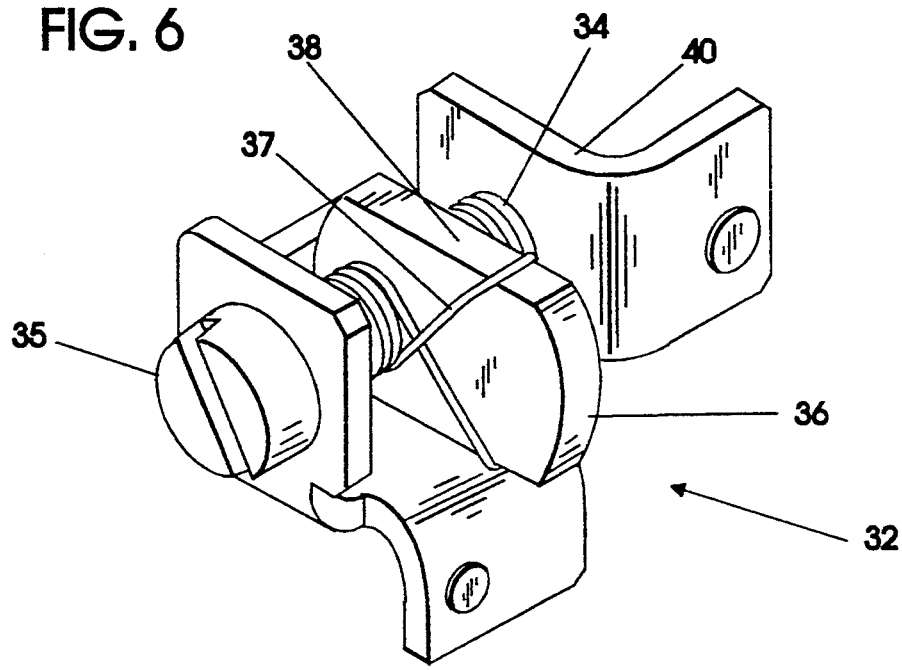
FIG. 6 is a perspective view of insertion and locking mechanism which is attached to the drawer structure and shown in partial view in FIGS. 4 and 5; and, FIG. 7 is sectional view of the bus extender card support mechanism shown in FIG. 4.

In FIG. 6 a machine screw 34 having a slotted head 35 has threaded thereon a cam member 36. One end of a spring 37 engages one side 38 of the cam 36 and takes a single turn around the machine screw 34. The other end of spring 37 engages the cam wall opposite wall 38. When installed spring 37 establishes a frictional force which holds the cam 36 in a fixed position on the screw 34. The frictional force holding cam 36 on screw 34 will be over come whenever the cam 36 is restricted as shown in FIG. 5. As the screw 34 is rotated in clockwise direction (as illustrated in FIG. 6) the cam 36 engages the bottom surface of an opening 39 in side wall 11. As screw 34 continues to turn cam 36 travels along the screw 34 towards the rear wall of the opening 39. Once cam 36 engages the rear wall of opening 39, further rotation of the screw in the same direction causes the drawer 20 to advance into the tunnel. When drawer 20 fully engages the pins 19 a predetermined torque applied to the screw 34 will ensure that the card edge conductors are fully inserted into the connector 16. In addition the drawer is locked in place by the cam 36. The friction provided between the rear surface of opening 39 and the mating surface of cam 36 will prevent movement of the cam in the event of vibration.

While screw 34 is inserted in a threaded opening of cam 36 it is supported in two clear bore holes in bracket 40 which is attached to a side wall 33 of base 23 as shown in FIG. 4. Mechanism 32 is assembled by first inserting screw 34 through one of the bore holes in bracket 40. Spring 37 is mounted on the screw and cam 36 is threaded onto the screw. Then screw 34 is inserted through the other bore hole in the bracket 40. A C clip or ring, not shown, is forced onto the end of the screw to prevent withdrawal of the screw from the bracket 40. Once the cam 36 is positioned on the screw 34, spring 37 is defected and made to engage the opposite surfaces 38 of cam 36 to provide the friction described above.

Figure 7:
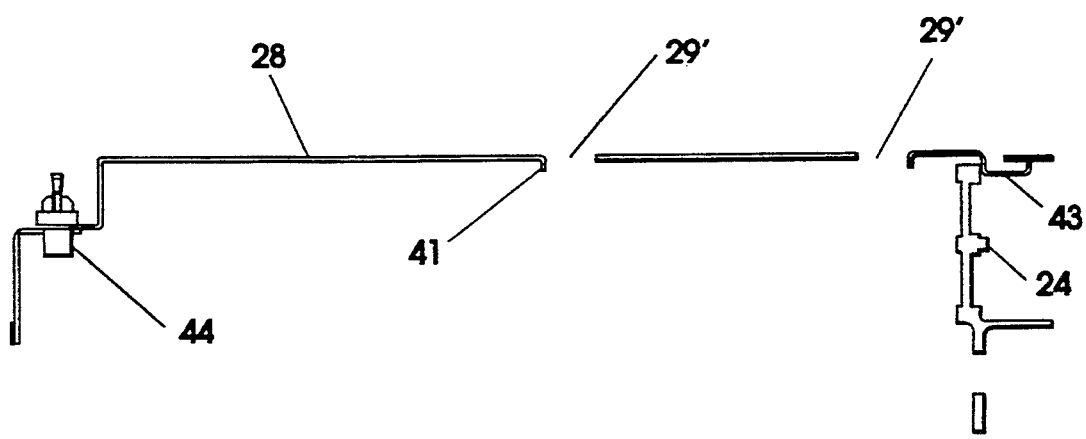

The sectional view illustrated in FIG. 7 shows how the support 28 mounts on the feature card supports 24 and how it restrains the bus extender card 25. The two tab pairs 29 described above are not shown in this view, however, they are located in the spaces 29'. Each pair engages an opposite surface of the card 25. Projections 41 engage opposite edges of the card 25 while the surface 42 of support 28 prevents withdrawal of card 25 from connector 26. This arrangement is in all three orthogonal directions.

Support 28 at one end is provided with a flange 43 which is inserted in an opening in the feature card support 24. At the other end support 28 is provided with a cam locking device 44 which engages a hole, not shown, in the top surface of the other feature card support 24. In addition to supporting and restricting the movement of card 25, support 28 provides an additional degree of rigidity to the drawer structure.

While only a single embodiment of the invention has been shown and described in detail, it will be obvious to those skilled in the art that changes and modification can be made with out departing from the spirit and scope of the invention.

What is claimed is:

1. An alignment mechanism for aligning a first connector mounted on the rear wall of a cavity in an equipment cabinet with a second connector mounted on a drawer adapted to be inserted therein in operative engagement comprising:

first means engaging the said rear wall of the cavity and projecting into said cavity;

second means mounted on a surface of the drawer opposite the rear wall of the cavity when the drawer is inserted in the cavity and for engaging said first means as the drawer is inserted in the cavity to align said connector on the drawer with the connector on the rear wall of the cavity in two orthogonal directions in a plane parallel with the plain of the rear wall of the cavity; and third means mounted on the drawer for engaging at least one other wall of the cavity, said third means including a screw having a drive head, a bracket attached to the drawer supports the screw for free rotation, a cam member threaded on the said screw, and means engaging the cam and the screw for establishing a predetermined friction therebetween whereby rotation of the screw via the drive head causes the cam to rotate into engagement with said other wall of the cavity and further rotation produces a force which drives the drawer into the cavity and the friction between the cam and the said other wall locks the drawer in place.

2. An alignment mechanism as set forth in claim 1 in which the means engaging the cam and screw for establishing a predetermined friction therebetween comprises a spring wrapped around the screw and having two free ends engaging opposite surfaces of the cam.

3. An alignment mechanism as set forth in anyone of claims 1 through 3 in which;

said cavity includes a substantially rectangular tunnel having a bottom wall, a top wall spaced therefrom and a pair of spaced side walls connecting the said bottom and top walls;

said rear wall of the cavity includes a removable cover, a circuit card attached to the removable cover, said circuit card including a pair of spaced apertures and the said connector; and, said first means includes a first pair of locating pins attached to the tunnel and adapted to engage the apertures in the said circuit card for locating the circuit card with respect to a second pair of locating pins adapted to engage the said second means mounted on the drawer.

4. An electronic equipment assembly comprising in combination:

a drawer for supporting electrical devices;

a housing having spaced walls forming a cavity for receiving said drawer;

a first connector mounted on one of the spaced walls;

first means engaging said one of the spaced walls and projecting into said cavity;

a second connector mounted on a selected surface of the drawer opposite the one of the spaced walls supporting the first connector when the drawer is inserted in the cavity;

second means mounted on the selected surface and for engaging said first means as the drawer is inserted in the cavity to align said first connector and said second connector in two orthogonal directions in a plane parallel with the plain one of the spaced walls supporting the connector; and a third means for fully inserting the drawer into the cavity under control of a force and locking in place the drawer when the force is removed; said third means including a screw having a drive head;

a bracket attached to the drawer supports the screw for free rotation;

a cam member threaded on the said screw; and means engaging the cam and the screw for establishing a predetermined friction therebetween whereby rotation of the screw via the drive head causes the cam to rotate into engagement with said other wall of the cavity and further rotation produces a said force which drives the drawer into the cavity and the friction between the cam and the said other wall locks the drawer in place.

* * * * *